United States Patent
Hiraga

(10) Patent No.: US 11,313,555 B2
(45) Date of Patent: Apr. 26, 2022

(54) COOKING BURNER AND ROASTING PROCESSING METHOD

(71) Applicant: Nanohana Commercial Co., Ltd., Kanagawa (JP)

(72) Inventor: Hideki Hiraga, Kanagawa (JP)

(73) Assignee: Nanohana Commercial Co., Ltd., Kanagawa (JP)

(*) Notice: Subject to any disclaimer, the term of this patent is extended or adjusted under 35 U.S.C. 154(b) by 412 days.

(21) Appl. No.: 16/610,104

(22) PCT Filed: Oct. 16, 2017

(86) PCT No.: PCT/JP2017/037376
§ 371 (c)(1),
(2) Date: Nov. 1, 2019

(87) PCT Pub. No.: WO2019/077653
PCT Pub. Date: Apr. 25, 2019

(65) Prior Publication Data
US 2020/0080721 A1    Mar. 12, 2020

(51) Int. Cl.
F23D 14/58    (2006.01)
(52) U.S. Cl.
CPC .................... F23D 14/58 (2013.01)
(58) Field of Classification Search
CPC ........... F23D 14/38; F23D 14/04; F23D 14/58
USPC ......... 126/39 E, 39 R; 431/8, 142–143, 254, 431/326, 354, 344, 355
See application file for complete search history.

(56) References Cited

U.S. PATENT DOCUMENTS

| | | | | |
|---|---|---|---|---|
| 3,198,235 A | * | 8/1965 | Maskell | F23C 7/006 454/308 |
| 3,352,492 A | * | 11/1967 | Cape | B05B 7/1413 239/85 |
| 5,588,825 A | * | 12/1996 | Kostiuk | F23D 14/58 239/590.5 |
| 2004/0202978 A1 | | 10/2004 | Wong | |
| 2005/0100848 A1 | | 5/2005 | Meister | |

(Continued)

FOREIGN PATENT DOCUMENTS

| | | |
|---|---|---|
| CN | 104566369 A | 4/2015 |
| JP | 36-030777 Y1 | 11/1961 |
| JP | S59103012 U | 7/1984 |

(Continued)

OTHER PUBLICATIONS

Patent Cooperation Treaty, International Search Report of the International Searching Authority and English Translation for International Application PCT/JP2017/037376 dated Dec. 19, 2017, 4 pages.

*Primary Examiner* — Vivek K Shirsat
(74) *Attorney, Agent, or Firm* — Fitch, Even, Tabin & Flannery, LLP

(57) ABSTRACT

The present invention provides a tubular member and a burner with a tubular member that is capable of improving the flavor of a food product having undergone roasting treatment. A tubular member that is a part of a burner with a tubular member is attached to a tip of a gas burner, and has holes through which the combusting flames pass. This configuration eliminates gas odor from a food product having undergone roasting treatment. Thus, the flavor of the food product having undergone roasting treatment can be improved.

8 Claims, 3 Drawing Sheets

(56) References Cited

U.S. PATENT DOCUMENTS

2014/0287371 A1\* 9/2014 Huang .................... F23D 14/04
　　　　　　　　　　　　　　　　　　　　　431/354
2015/0350626 A1\* 12/2015 Han ..................... H04N 13/261
　　　　　　　　　　　　　　　　　　　　　348/43

FOREIGN PATENT DOCUMENTS

| JP | S59186608 U | 12/1984 |
|---|---|---|
| JP | H08-060167 A | 3/1996 |
| JP | 2007-510886 A | 4/2007 |

\* cited by examiner

COOKING BURNER AND ROASTING PROCESSING METHOD

CROSS-REFERENCE TO RELATED APPLICATIONS

This application is a U.S. national phase application filed under 35 U.S.C. § 371 of International Application Number PCT/JP2017/037376, filed Oct. 16, 2017, designating the United States.

TECHNICAL FIELD

The present invention relates to a tube member and a burner with a tube member.

BACKGROUND ART

Conventionally, in order to prevent accidents such as poisoning, ignition, and explosion, fuel gas has been added with an odorant having a specific odor so that it can be detected quickly and easily by appealing to the sense of smell when leaked. Conventionally known odorants include sulfur compounds such as mercaptan and sulfide, and these are used singly or in combination. Currently, the sulfur-containing compounds used are very small and have a high odor effect, and their odor quality is generally perceived as a gas odor (for example, refer to Patent Literature 1).

PRIOR ART DOCUMENT

Patent Literature

Patent Literature 1: JP H08-060167 A

SUMMARY OF INVENTION

Technical Problem

By the way, a roasting process such as roasting a surface of a food material or blowing off moisture on the surface may be performed with a combustion flame such as a gas burner. At this time, the odorant added to the fuel gas may adhere to the food material as a gas odor, which may deteriorate the flavor of the food.

An object of the present invention is to provide a tubular member and a burner with a tubular member that can improve the flavor of foods that have been subjected to roasting processing.

Solution to Problem

A tubular member of the present invention is attached to a tip of a gas burner and has a hole portion through which a combustion flame passes.

According to the present invention as described above, gas odor does not occur from food that has been subjected to roasting processing by being roasted by the combustion flame that has passed through the hole. It is presumed that gas odor was reduced due to complete combustion of the flame and the generation of far infrared rays. Therefore, the flavor of the processed food can be improved.

Further, preferably, a plurality of hole portions is formed, one of the plurality of hole portions is formed at a central position in a direction perpendicular to an output direction of the combustion flame, and the hole portions excluding the one are formed side by side in a circumferential direction centering on the one. That is, since the plurality of hole portions are formed at predetermined positions, a large amount of oxygen can be taken into the combustion flame. As a result, the combustion flame to be output can be brought into a completely burned state, so that the gas odor can be further reduced, and the flavor of the processed food can be further improved.

Moreover, preferably, the tubular member is made of a material containing carbon. According to this, since the flavor of charcoal can be attached to the foodstuff, the flavor of the food subjected to the roasting process can be further improved.

On the other hand, a burner with a tubular member of the present invention comprises a gas burner and the tubular member according to any one of aspects 1 to 3, wherein the tubular member is attached to a tip of the gas burner. According to this, it is possible to improve the flavor of the food that has been subject to roasting processing.

Effect of the Invention

According to the present invention, it is possible to improve the flavor of foods that have been subjected to roasting processing.

DESCRIPTION OF EMBODIMENTS

Figure 1:
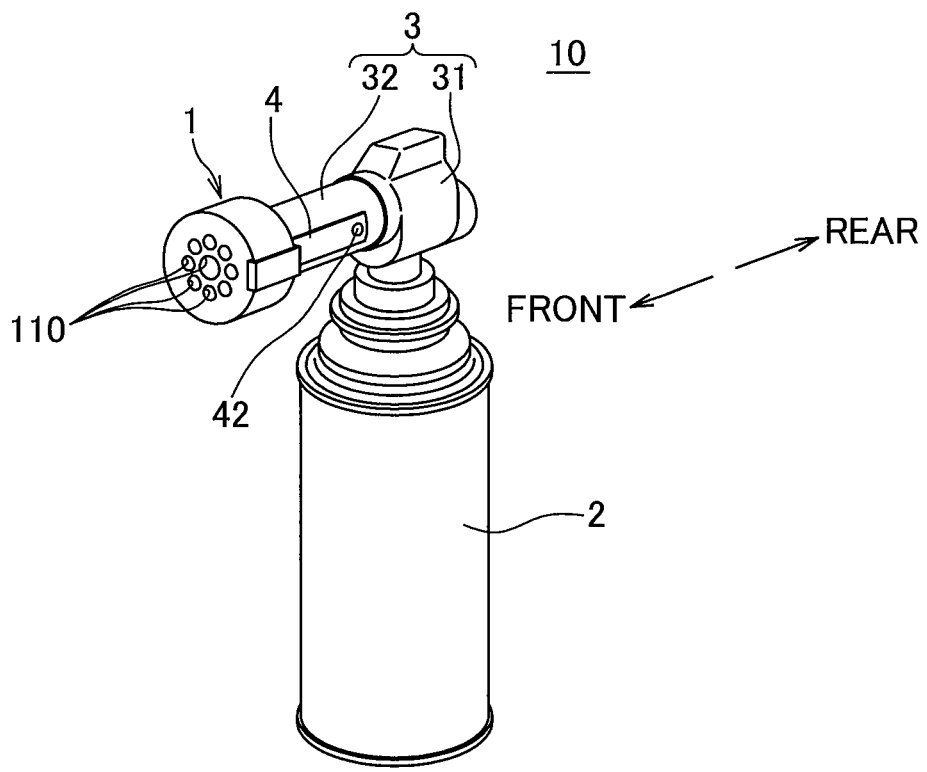
FIG. 1 is a perspective view showing a burner with a tubular member containing the tubular member according to one embodiment of the present invention.

Hereinafter, a burner with a tubular member 10 according to a first embodiment of the present invention will be described with reference to FIGS. 1 to 5. FIG. 1 is a perspective view showing a burner with a tubular member 10 including a tubular member 1 according to the first embodiment of the present invention. In the drawings, an axial direction of the tubular member 1 may be referred to as "front-rear direction" and an output direction of a combustion flame may be referred to as "front".

Figure 2:
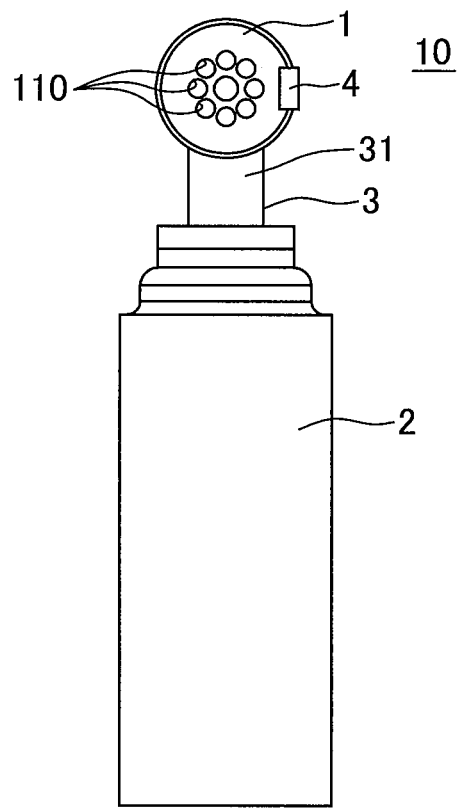
FIG. 2 is a plan view showing the burner with the tubular member seeing from an output direction of a combustion flame.

As shown in FIGS. 1 and 2, the burner with the tubular member 10 includes: a gas cylinder 2 filled with LP gas (liquefied propane gas); a gas burner 3 that supplies oxygen to LP gas delivered from the gas cylinder 2 to output a combustion flame; the tubular member 1 that is attached to a tip of the gas burner 3 and allows the combustion flame to pass therethrough; and a support member 4 for supporting the tubular member 1 on the gas burner 3.

Figure 4:
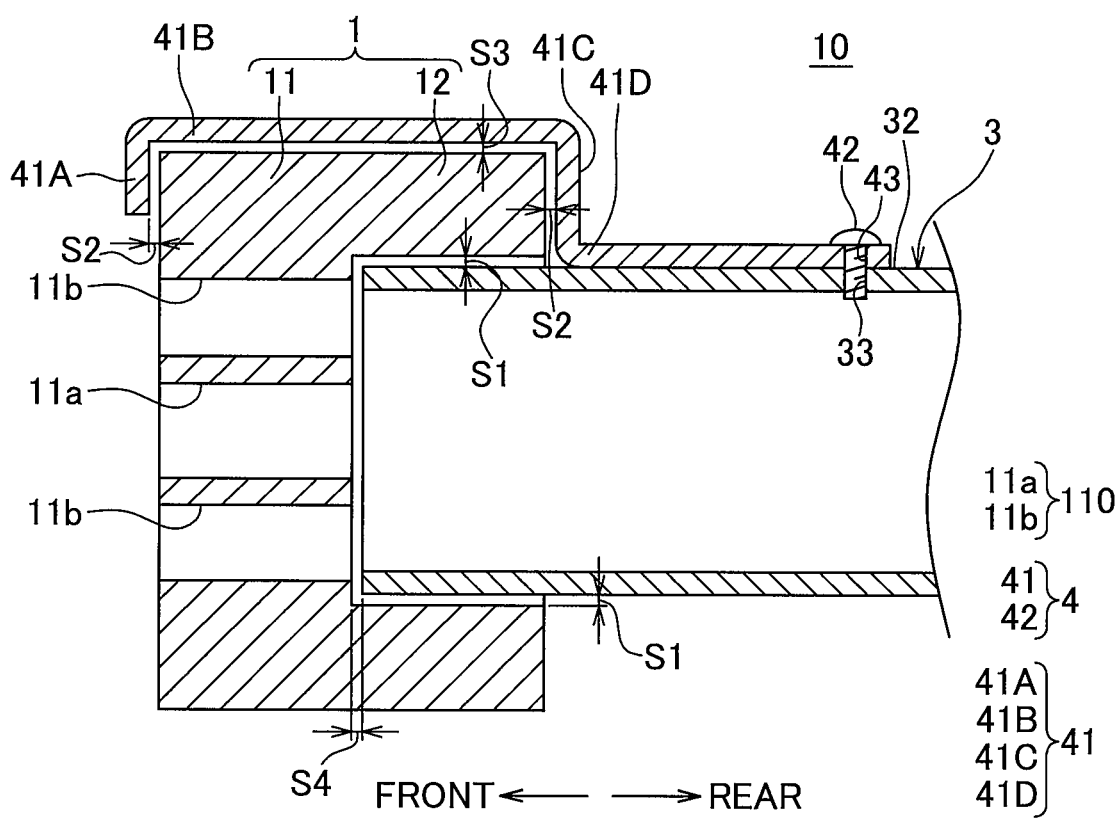
FIG. 4 is a sectional view showing a part of the burner with the tubular member.

The gas burner 3 includes: an adjustment mechanism 31 for adjusting the amount of gas sent out from the gas cylinder 2 and taking in air (oxygen) mixed into the gas; and a metal pipe 32 that outputs the combustion flame sent out from the adjusting mechanism 31 in a predetermined direction (front-rear direction). The metal pipe 32 is formed with a screw hole 33 into which a screw 42 of the support member 4 is screwed. As shown in FIG. 4, the screw hole 33 is formed at a position where while the screw 42 is screwed (hereinafter sometimes referred to as screwed state), a gap S4 in the axial direction is formed between a boundary between a main body portion 11 and an insertion tubular portion 12 of the tubular member 1 and the metal pipe 32.

Figure 3:
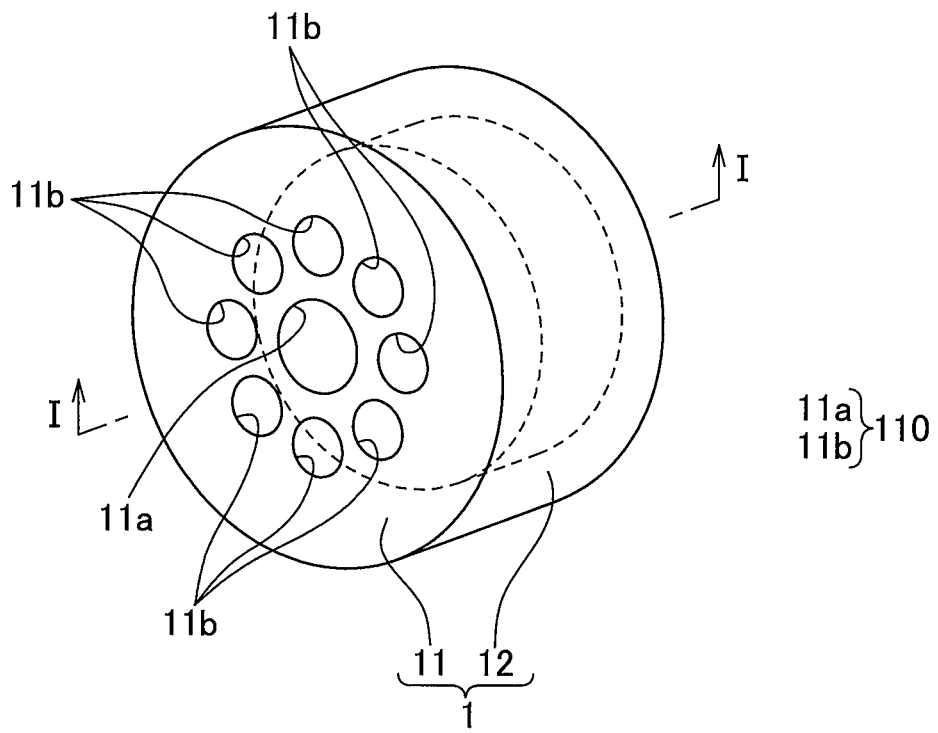
FIG. 3 is a perspective view showing a part of the tubular member which comprises the burner with the tubular member transparently.
Figure 5:
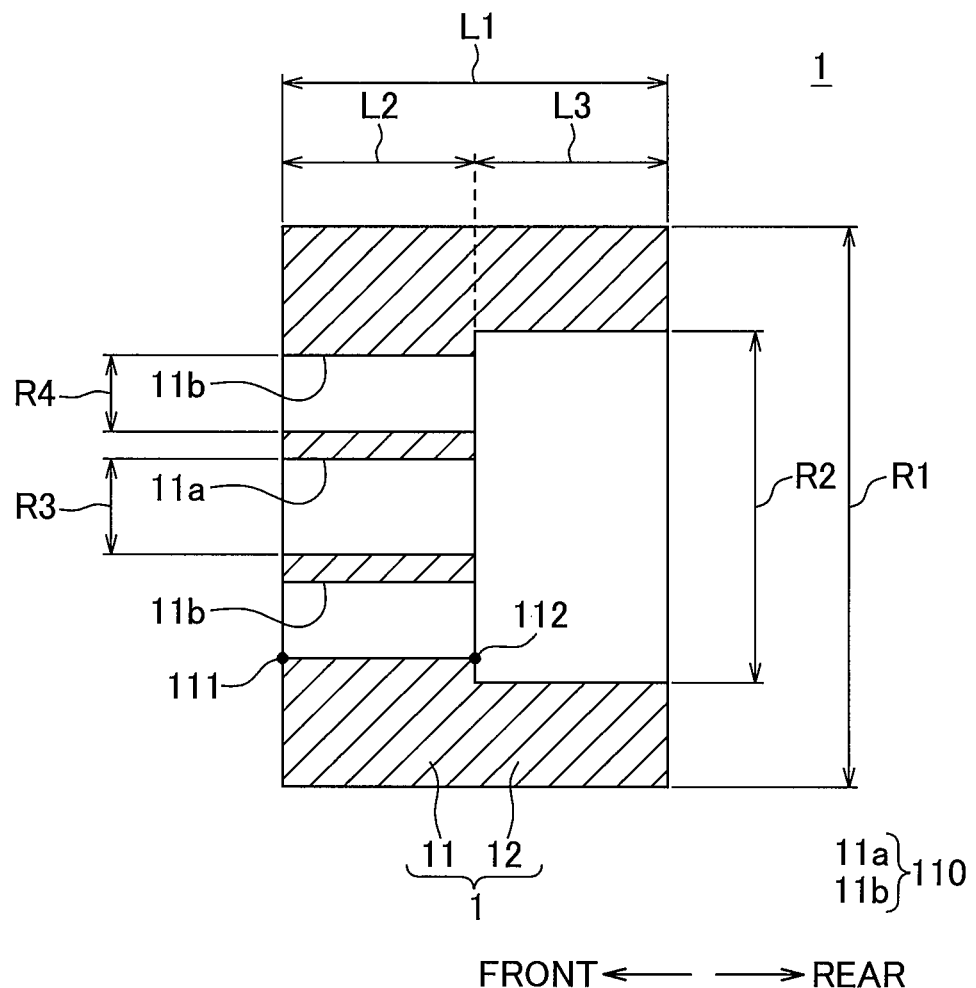
FIG. 5 is a sectional view taken along line I-I in FIG. 3.

In the present embodiment, the tubular member 1 is made of an isotropic graphite material. As shown in FIGS. 3 to 5, the tubular member 1 is integrally formed with the disc-shaped main body portion 11 having a plurality of (9 in the illustrated example) through holes, and the insertion tubular portion 12 which is erected in a cylindrical shape from a peripheral edge of the main body portion 11 and into which metal pipe 32 of the gas burner 3 is inserted.

As shown in FIGS. 4 and 5, the main body portion 11 is formed so that a shaft dimension L2 is a predetermined thickness, and has a plurality of (9 in the illustrated example) through-holes 110 penetrating in the axial direction that are circular in plan view.

Among the nine through-holes 110, one (hereinafter may be referred to as the center hole 11a) is formed at a center position of the disc-shaped main body portion 11 (the same position as the center point P of the main body portion 11). The remaining eight through-holes are formed around the center position and at equal intervals. a diameter of the center hole 11a is formed so as to be slightly larger than diameters of the remaining eight through holes (hereinafter also referred to as surrounding holes) described later. The nine through-holes 110 are formed such that an end (front end) 111 in the front in the axial direction (output direction of the combustion flame) communicates with the outside, and a rear end (rear end) 112 in the axial direction communicates with an inside of the insertion tubular portion 12. Further, the nine through-holes 110 are formed so that the inner diameter dimension is substantially constant from the front end 111 to the rear end 112.

The insertion tubular portion 12 is formed coaxially with the main body portion 11, and an outer diameter of the insertion tubular portion 12 is substantially equal to an outer diameter R1 of the main body portion 11 (an outer diameter R1 of the tubular member 1). Further, an inner diameter R2 of the insertion tubular portion 12 is formed to be larger than an outer diameter of the metal pipe 32 of the gas burner 3. That is, as shown in FIG. 4, while the tip of the metal pipe 32 is inserted into the insertion tubular portion 12, a gap S1 is formed in a radial direction between the insertion tubular portion 12 and the metal pipe 32.

As shown in FIG. 5, the tubular member 1 is formed such that the axial dimension L1 of the tubular member 1 is 25 mm, the axial dimension L2 of the main body 11 is 12.5 mm, the axial dimension L3 of the insertion tubular portion 12 is 12.5 mm, the outer diameter R1 of the tubular member 1 is 36 mm, the inner diameter R2 of the insertion tubular portion 12 is 22 mm, the diameter R3 of the center hole 11a is 6 mm, and the diameter R4 of the surrounding hole is 5 mm.

In the present embodiment, each of the above dimensions is merely an example, and in the present invention, it may be appropriately designed according to the diameter of the metal pipe, thermal power, application, etc. For example, preferably, the axial dimension L1 of the tubular member 1 is 20 mm to 60 mm, the axial dimension L2 of the main body 11 is 10 mm to 55 mm, the axial dimension L3 of the insertion tubular portion 12 is 5 mm to 50 mm, the outer diameter R1 of the tubular member 1 is 35 mm to 37 mm, the inner diameter R2 of the insertion tubular portion 12 is 21 mm to 23 mm, the diameter R3 of the center hole 11a is 5 mm to 7 mm, and the diameter R4 of the surrounding hole is 4 mm to 6 mm.

Further, in the present embodiment, the number of through-holes as the holes formed in the tubular member is nine, but the present invention is not limited to this. The number of through-holes may be one or more, and the size may be designed as appropriate. Further, each through-hole 110 is formed so that the inner diameter dimension is substantially constant from the front end 111 to the rear end 112, but the present invention is not limited to this. Each through hole may be formed so that its diameter dimension gradually increases toward the front end 111, or may be formed so that its diameter dimension gradually decreases toward the front end 111.

As shown in FIGS. 1 and 4, the support member 4 includes: a plate member 41 obtained by bending a rectangular plate-shaped sheet metal; and a screw 42 for fixing the plate member 41 to the metal pipe 32.

As shown in FIG. 4, the plate member 41 includes: a first plate portion 41A extending in the radial direction of the tubular member 1; a second plate portion 41B that is continuous with the first plate portion 41A and extends in the axial direction of the tubular member 1; a third plate portion 41C that is continuous with the second plate portion 41B and extends in the radial direction of the tubular member 1; and a fourth plate portion 41D that is continuous with the third plate portion 41C and extends in the axial direction of the tubular member 1. That is, the first plate portion 41A and the third plate portion 41C are formed to face each other. The axial dimension of the second plate portion 41B is formed to be slightly larger than the axial dimension L1 of the tubular member 1. A screw hole 43 into which the screw 42 is screwed is formed in the fourth plate portion 41D.

That is, a gap S2 is formed between the first plate portion 41A and the tubular member 1, and between the third plate portion 41C and the tubular member 1 in the axial direction in a state where the screw 42 is screwed. Further, the diameter of the third plate portion 41C is formed such that a gap S3 is provided between the insertion tubular portion 12 and the second plate portion 41B in the radial direction in a state where the screw 42 is screwed. In this way, the gaps S1, S2, S3, S4 are formed between the tubular member 1, the support member 4, and the metal pipe 32 in a state where the screw 42 is screwed. Thus, air is easily taken into the combustion flame passing through the through holes 110 from the gaps S1, S2, S3, and S4.

A method for attaching such a tubular member 1 to the metal pipe 32 will be described.

The axial direction of the tubular member 1 is arranged along the axial direction of the metal pipe 32 of the gas burner 3, and the insertion tubular portion 12 is brought close to the tip of the metal pipe 32 to insert the tubular member 1. With this inserted state, the tubular member 1 is sandwiched between the first plate portion 41A and the third plate portion 41C of the support member 4, and the screw 42 is screwed to the screw hole 43 of the support member 4 and the screw hole 33 of the metal pipe 32. In this way, the tubular member 1 is attached to the gas burner 3.

According to the embodiment described above, the combustion flame that has passed through the through-holes 110 (hole portions) applying the roasting process, the gas odor will not be generated from the food subjected to roasting processing. It is presumed that gas odor was reduced due to complete combustion of the flame and the generation of far infrared rays. Therefore, the flavor of the food subjected to the roasting process can be improved.

Further, a plurality of through-holes 110 (hole portions) are formed, and one of the plurality of holes (center hole 11a) is formed at a center position in a direction perpendicular to the output direction of the combustion flame, and the plurality of holes (surrounding holes 11b) excluding the one (center hole 11a) is formed side by side in the circumferential direction centering on the one (center hole 11a). That is, since a plurality of through-holes 110 (hole portions) is formed at predetermined positions, a large amount of oxygen can be taken into the combustion flame. As a result, the combustion flame to be output can be brought into a completely burned state, so that the gas odor can be further reduced, and the flavor of the food subjected to the roasting process can be further improved.

Further, the tubular member 1 is made of a material containing carbon (isotropic graphite material). According to this, since the flavor of charcoal can be attached to the food material, the flavor of the food subjected to the roasting process can be further improved. As materials containing carbon, various graphite materials, charcoal, bamboo charcoal, coal (coke), etc. can be used.

In addition, this invention is not limited to the above embodiment, and includes other modifications etc. which can achieve the object of the present invention. The modification as shown below is also contained in the present invention.

In the above embodiment, the tubular member 1 is made of isotropic graphite material, but the present invention is not limited to this. The tubular member 1 may be made of ceramic or various metals. Even when the tubular member 1 is made of these metals, the gas odor does not occur from the food subjected to the roasting process. That is, as compared with the first embodiment, although the flavor is inferior to the extent that the flavor of charcoal does not adhere to the food, the flavor of the food subjected to the roasting process can be improved.

Further, in the above embodiment, the gaps S1, S2, S3, and S4 are formed between the tubular member 1 and the support member 4, and between the tubular member 1 and the metal pipe 32 in a state where the screw 42 is screwed. However, the present invention is not limited to this. In the state where the screw 42 is screwed, the gaps located between the tubular member 1 and the support member 4, and between the tubular member 1 and the metal pipe 32 may be appropriately provided according to the use and required performance. Even a tubular member designed so that the gaps S1, S2, S3, and S4 are not generated is included in the scope of the present invention.

Next, the inventors of the present invention confirmed the effects of the present invention by letting 30 subjects taste the following foods. First, the subjects were made to sample a food (denoted as food 1) obtained by roasting food with a gas burner 3 without the tubular member 1, and then the following three foods were sampled. Relative to food 1, answer A if the subject feels the taste is better, answer B if the subject feels the taste does not change, and answer C if the subject feels the taste is not good.

1) Food that has been subjected to the roasting process by using a burner 10 with a tubular member 1 made of isotropic graphite;

2) Food that has been subjected to the roasting process by a burner with a tubular member made of ceramic;

3) Food that has not been subjected to the roasting process.

For 1), all of the 30 subjects answered A;

For 2), 23 of 30 subjects answered A and the remaining 7 answered B;

For 3), 3 of 30 subjects answered A, 5 answered B, and the remaining 22 answered C. From the above results, the excellent taste improving effect of the present invention could be confirmed.

In addition, the best configuration, method, and the like for carrying out the present invention have been disclosed above, but the present invention is not limited to these. That is, the present invention has been illustrated and described primarily with respect to particular embodiments, but without departing from the spirit and scope of the present invention, various modifications can be made by those skilled in the art in terms of shape, material, quantity, and other detailed configurations. Therefore, the description limited to the shape, material, etc. disclosed above is an example for easy understanding of the present invention, and does not limit the present invention. The description by the name of the member which removed the limitation of a part of shape, material, etc. or all limitations is included in the present invention.

REFERENCE SIGNS LIST 1 tubular member
3 gas burner
10 burner with tubular member
110 through hole (hole portion)
11a center hole (one of a plurality of hole portions)
11b surrounding holes (hole portions excluding the one of the plurality of hole portions)

The invention claimed is:

1. A cooking burner comprising:
a gas burner with a metal pipe;
a tubular member attached to a tip of the metal pipe and having a hole portion through which a combustion flame thereof passes; and
a support member for supporting the tubular member on the metal pipe,
wherein the tubular member has a disk-shaped main body portion in which the hole portion is formed, and an insertion tubular portion erected in a cylindrical shape from a periphery of the main body portion and into which the metal pipe is inserted,
wherein the support member includes:
a U-shaped portion having a plate portion and a pair of opposed plate portions that are continuous with each end of the plate portion and face each other; and
a fixed plate portion that is continuous with one of the pair of opposed plate portions and is provided to face the plate portion and is fixed to the metal pipe, and
wherein the metal pipe, the tubular member, and the support member are formed in such a size that a first gap is formed between the pair of opposed plate portions and the tubular member in an axial direction, a second gap is formed between the plate portion and the tubular member in a radial direction, a third gap is formed between the metal pipe and an inner peripheral surface of the insertion tubular portion in the radial direction, and a fourth gap is formed between a tip end of the metal pipe and a base end of the hole portion in the axial direction.

2. The cooking burner as claimed in claim 1,
wherein a plurality of the hole portions is formed,
wherein one of the plurality of hole portions is formed at a central position in a surface perpendicular to an output direction of the combustion flame, and wherein among the plurality of hole portions, the hole portions excluding the one are formed side by side in a circumferential direction centering on the one.

3. The cooking burner as claimed in claim 1,
wherein the tubular member is made of a material containing carbon.

4. The cooking burner as claimed in claim 2,
wherein the tubular member is made of a material containing carbon.

5. A roasting processing method that roasts ingredients with a burner,
wherein using the cooking burner according to claim 1 as the burner.

6. A roasting processing method that roasts ingredients with a burner,
wherein using the cooking burner according to claim 2 as the burner.

7. A roasting processing method that roasts ingredients with a burner,
wherein using the cooking burner according to claim 3 as the burner.

8. A roasting processing method that roasts ingredients with a burner,
wherein using the cooking burner according to claim 4 as the burner.

* * * * *